(12) United States Patent
White et al.

(10) Patent No.: US 9,136,716 B2
(45) Date of Patent: Sep. 15, 2015

(54) BOTTOM BASED BALANCING IN LITHIUM ION SYSTEM

(75) Inventors: Daniel J. White, Baltimore, MD (US);
Lyle Matson, Shrewsbury, PA (US);
Nathan Cruise, Phoenix, MD (US)

(73) Assignee: Black & Decker Inc., Newark, DE (US)

( * ) Notice: Subject to any disclaimer, the term of this patent is extended or adjusted under 35 U.S.C. 154(b) by 582 days.

(21) Appl. No.: 12/250,673

(22) Filed: Oct. 14, 2008

(65) Prior Publication Data

US 2009/0096419 A1    Apr. 16, 2009

Related U.S. Application Data

(60) Provisional application No. 60/999,024, filed on Oct. 15, 2007.

(51) Int. Cl.
*H02J 7/00* (2006.01)
*B60L 11/18* (2006.01)
*H01M 2/30* (2006.01)
*H01M 2/34* (2006.01)
*H01M 10/44* (2006.01)
*H01M 10/48* (2006.01)
*H01M 10/0525* (2010.01)
*H01M 10/42* (2006.01)

(52) U.S. Cl.
CPC .......... *H02J 7/0016* (2013.01); *B60L 11/1861* (2013.01); *H01M 2/30* (2013.01); *H01M 2/34* (2013.01); *H01M 10/441* (2013.01); *H01M 10/482* (2013.01); *H01M 10/0525* (2013.01); *H01M 2010/4271* (2013.01); *H01M 2200/00* (2013.01); *H01M 2220/30* (2013.01); *Y02T 10/7005* (2013.01); *Y02T 10/705* (2013.01); *Y02T 10/7011* (2013.01); *Y02T 10/7044* (2013.01)

(58) Field of Classification Search
USPC .......... 320/118, 116, 119, 120, 122, 135, 136
See application file for complete search history.

(56) References Cited

U.S. PATENT DOCUMENTS

| 5,680,026 | A | * | 10/1997 | Lueschen ........................ 429/97 |
| 5,764,027 | A | | 6/1998 | Harvey |
| 5,811,959 | A | * | 9/1998 | Kejha ............................ 320/126 |
| 5,914,585 | A | * | 6/1999 | Grabon ......................... 320/125 |
| 6,137,260 | A | * | 10/2000 | Wung et al. .................. 320/116 |
| 6,373,226 | B1 | | 4/2002 | Itou et al. |
| 6,750,631 | B2 | | 6/2004 | Perelle |
| 6,798,170 | B2 | | 9/2004 | Cummings |

(Continued)

FOREIGN PATENT DOCUMENTS

| DE | 20107438 U1 | 12/2001 |
| DE | 10107619 A1 | 1/2003 |
| WO | 2008150362 A1 | 12/2008 |

OTHER PUBLICATIONS

Heusler, Nikolaus—European Search Report (EP 08 16 6598)—Dec. 11, 2012—Munich.

*Primary Examiner* — Edward Tso
*Assistant Examiner* — Aaron Piggush
(74) *Attorney, Agent, or Firm* — Michael Aronoff

(57) ABSTRACT

A method comprises discharging each of a plurality of cells of a battery pack, stopping the discharging of a selected cell of the plurality of cells when the selected cell reaches a predetermined capacity, and charging the plurality of cells after the discharging has stopped for all of the plurality of cells.

10 Claims, 8 Drawing Sheets

(56) References Cited

U.S. PATENT DOCUMENTS

| | | |
|---|---|---|
| 6,850,041 B2 | 2/2005 | Takano |
| 6,894,457 B2 * | 5/2005 | Germagian et al. .......... 320/119 |
| 6,960,899 B2 | 11/2005 | Kobayashi et al. |
| 7,061,207 B2 | 6/2006 | Patel et al. |
| 7,126,312 B2 | 10/2006 | Moore |
| 7,164,257 B2 | 1/2007 | Johnson et al. |
| 7,253,585 B2 * | 8/2007 | Johnson et al. ............... 320/112 |
| 7,279,867 B2 | 10/2007 | Benckenstein, Jr. et al. |
| 7,408,325 B2 * | 8/2008 | Yamamoto et al. ........... 320/133 |
| 7,598,706 B2 * | 10/2009 | Koski et al. ................... 320/117 |
| 7,659,696 B2 * | 2/2010 | Zeiler et al. ................... 320/115 |
| 7,782,013 B2 * | 8/2010 | Chang ........................... 320/116 |
| 7,855,528 B2 * | 12/2010 | Lee ................................ 320/107 |
| 7,893,657 B2 * | 2/2011 | Chavakula .................... 320/138 |
| 2002/0008523 A1 * | 1/2002 | Klang ........................... 324/429 |
| 2004/0257038 A1 * | 12/2004 | Johnson et al. ............... 320/116 |
| 2005/0127873 A1 * | 6/2005 | Yamamoto et al. ........... 320/116 |
| 2008/0258683 A1 * | 10/2008 | Chang ........................... 320/112 |
| 2009/0179615 A1 * | 7/2009 | Amron .......................... 320/114 |

* cited by examiner

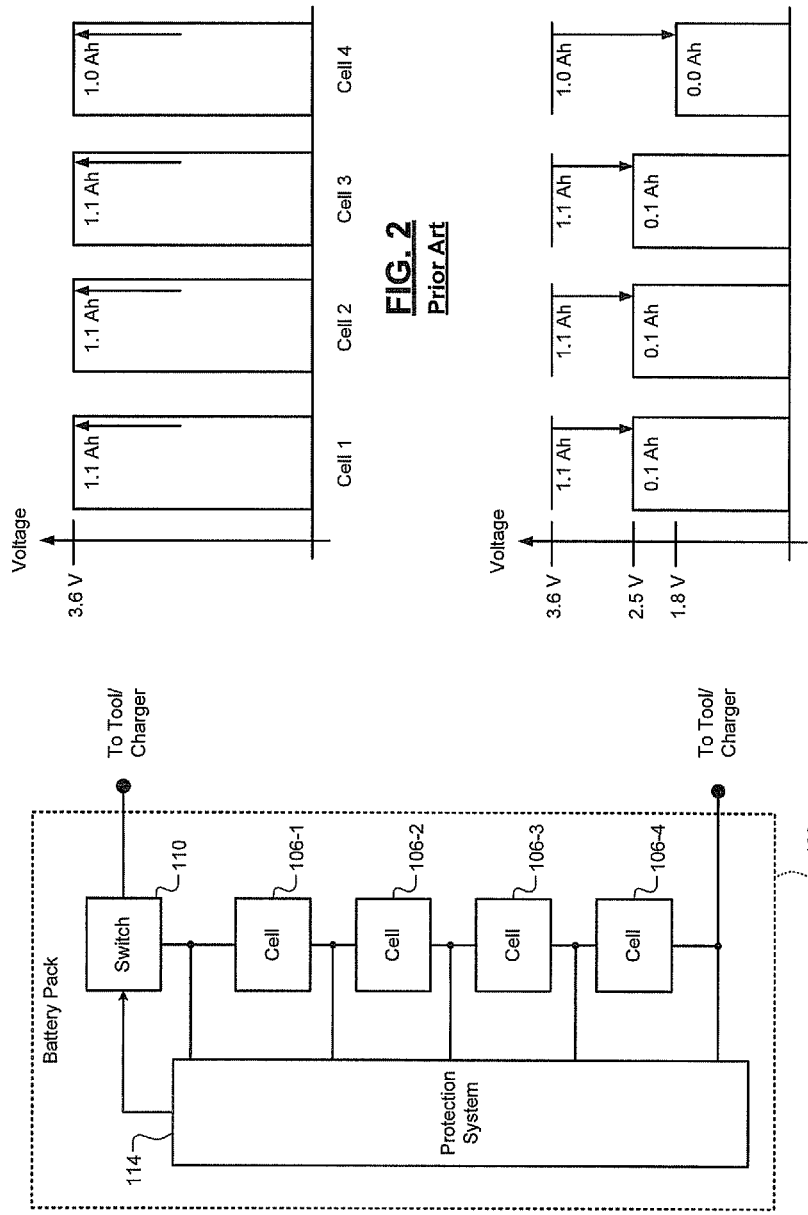

BOTTOM BASED BALANCING IN LITHIUM ION SYSTEM

CROSS-REFERENCE TO RELATED APPLICATIONS

This application claims the benefit of U.S. Provisional Application No. 60/999,024, filed on Oct. 15, 2007. The disclosure of the above application is incorporated herein by reference in its entirety.

FIELD

The present disclosure relates to battery charging, and more particularly to bottom based balancing in lithium ion batteries.

BACKGROUND

Referring now to FIG. 1, a functional block diagram of a battery pack 100 according to the prior art is presented. The battery pack 100 includes multiple cells 106-1, 106-2, 106-3, and 106-4, each having a positive and a negative terminal. The cells 106 are connected in series, with the positive terminal of one cell 106 connected to the negative terminal of the next cell 106. In various implementations, the cells 106 may be lithium ion (LiIon) charge storage cells.

The negative terminal of the cell 106-4 is connected to an external contact, which may interface with a power tool or a charger. The positive terminal of the cell 106-1 is connected to a switch 110. When the switch 110 is conducting, the positive terminal of the cell 106-1 is connected to an external contact, which may interface with the power tool or the charger. The switch 110 is controlled by a protection system 114. The protection system 114 monitors voltages at the positive and negative terminals of each of the cells 106.

The cells 106 may have varying charge storage capacities. The cells 106 with lower charge storage capacities will decrease in voltage faster than the cells 106 with larger storage capacities. The protection system 114 measures the voltages of the cells 106 and instructs the switch 110 to stop conducting when the voltage of one of the cells becomes too low. In addition, the switch 110 may stop conducting if the current flowing through it exceeds a safe operating level.

Referring now to FIG. 2, a graphical depiction of battery charging according to the prior art is presented. During battery charging, each of the cells is charged to a predetermined voltage. In FIG. 2, four cells are depicted, and they are each charged to 3.6 volts. At 3.6 volts (V), however, the cells may have varying capacities. For example, the first three cells may have a fully charged capacity of 1.1 ampere-hours (Ah), while the fourth cell has a capacity of 1.0 Ah. This imbalance causes problems during discharging, as shown in the next figure.

Referring now to FIG. 3, a graphical depiction of battery discharging according to the prior art is presented. As the battery pack is discharged, the voltages of the cells decrease. After 1.0 Ah has been drawn from the cells, the first three cells have 0.1 Ah remaining, and may be at a voltage of approximately 2.5 V. However, the fourth cell has zero capacity remaining, and may be at a lower voltage, such as 1.8 V, or even a negative voltage.

Battery cells, and especially LiIon cells, may be permanently damaged, and may even become unstable, when driven to low or negative voltages. The voltage of the fourth cell may be too low after 1.0 Ah has been drawn from the battery pack. For this reason, the protection system 114 of FIG. 1 monitors the voltage of each of the cells. Without this monitoring, the user may continue using the battery pack even as one or more of the cells 106 runs out of capacity. As current is drawn from the first three cells, the fourth cell may even be driven to a negative voltage, which is likely detrimental to the fourth cell. The protection system 114 can prevent this from happening, but is expensive and complicated to include in each battery pack.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method comprises discharging each of a plurality of cells of a battery pack, stopping the discharging of a selected cell of the plurality of cells when the selected cell reaches a predetermined capacity, and charging the plurality of cells after the discharging has stopped for all of the plurality of cells.

A battery charger comprises a discharging device, a charging device, and a control module. The discharging device discharges each of a plurality of cells of a battery pack. The charging device charges the plurality of cells. The control module selectively instructs the discharging device to discharge the plurality of cells. The control module selectively instructs the discharging device to stop discharging a selected cell of the plurality of cells when the selected cell reaches a predetermined capacity. The control module selectively instructs the charging device to begin charging the plurality of cells after discharging is stopped for all the plurality of cells.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a functional block diagram of a battery pack according to the prior art;

FIG. 2 is a graphical depiction of battery charging according to the prior art;

FIG. 3 is a graphical depiction of battery discharging according to the prior art;

DETAILED DESCRIPTION

Figure 5:
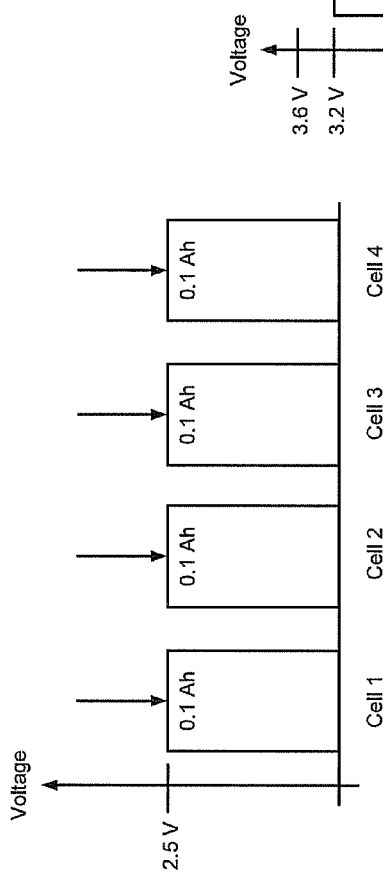
FIG. 5 is a graphical depiction of charging from a bottom balanced state according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 4A:
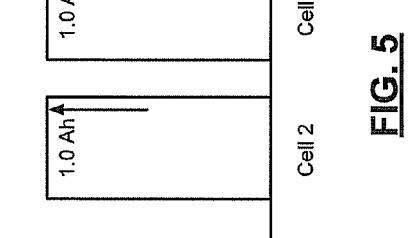
FIGS. 4A-4B are graphical depictions of bottom based balancing according to the principles of the present disclosure.
Figure 4B:
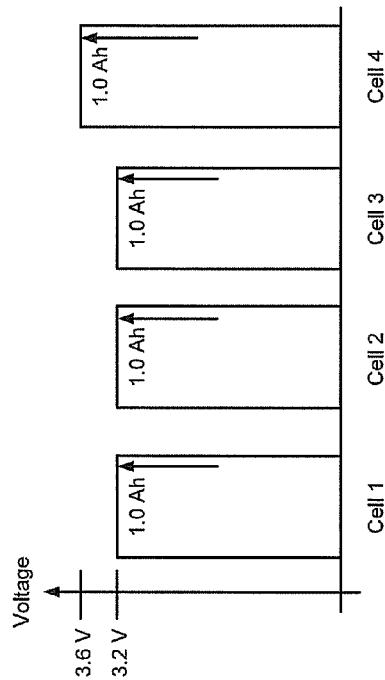

In prior art methods of battery charging, each cell is charged to a predetermined voltage, regardless of the resulting capacity in the cell. According to the principles of the present disclosure, each of the battery cells is discharged to a predetermined low capacity. Once the cells are balanced at this low capacity, an equal amount of capacity is added to all of the cells. To accomplish this, the cells may be charged from the predetermined low capacity until any of the cells reaches a maximum voltage. At this point, charging of all the cells can be stopped. FIGS. 4A-B and 5 graphically depict charging according to these principles.

Figure 6:
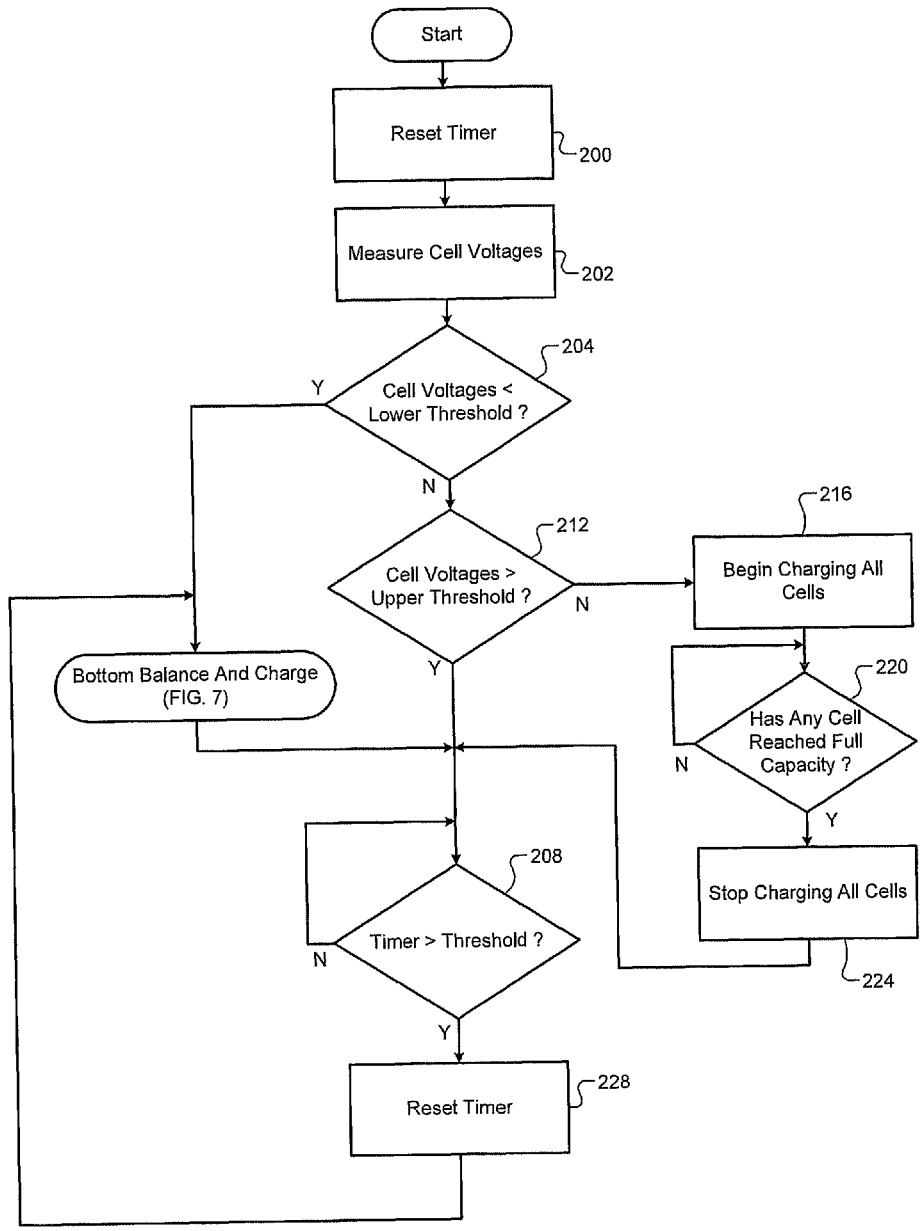
FIG. 6 is a flowchart depicting exemplary steps performed by a battery charger according to the principles of the present disclosure.
Figure 7:
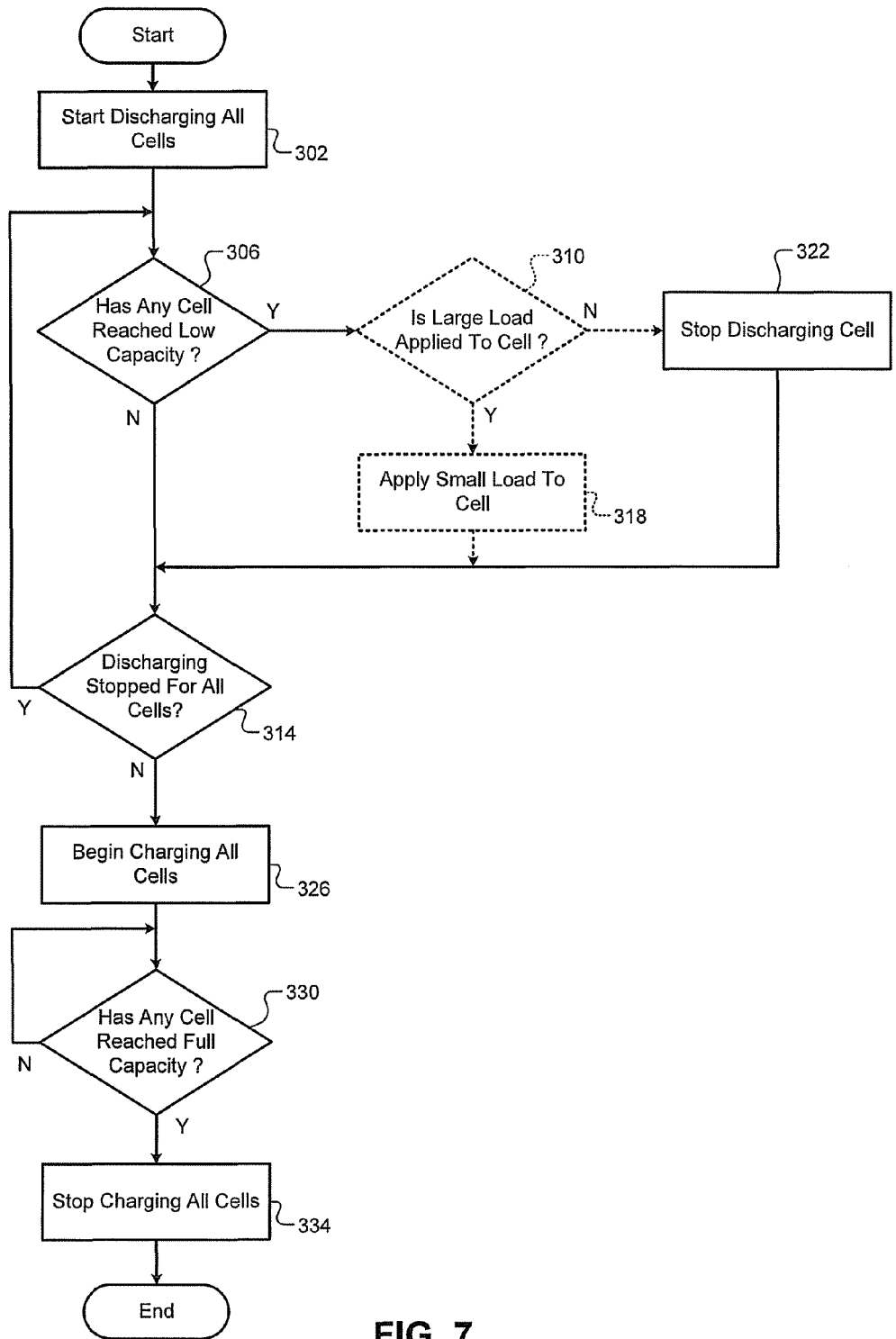
FIG. 7 is a flowchart depicting exemplary steps performed in bottom balancing and charging according to the principles of the present disclosure.
Figure 8A:
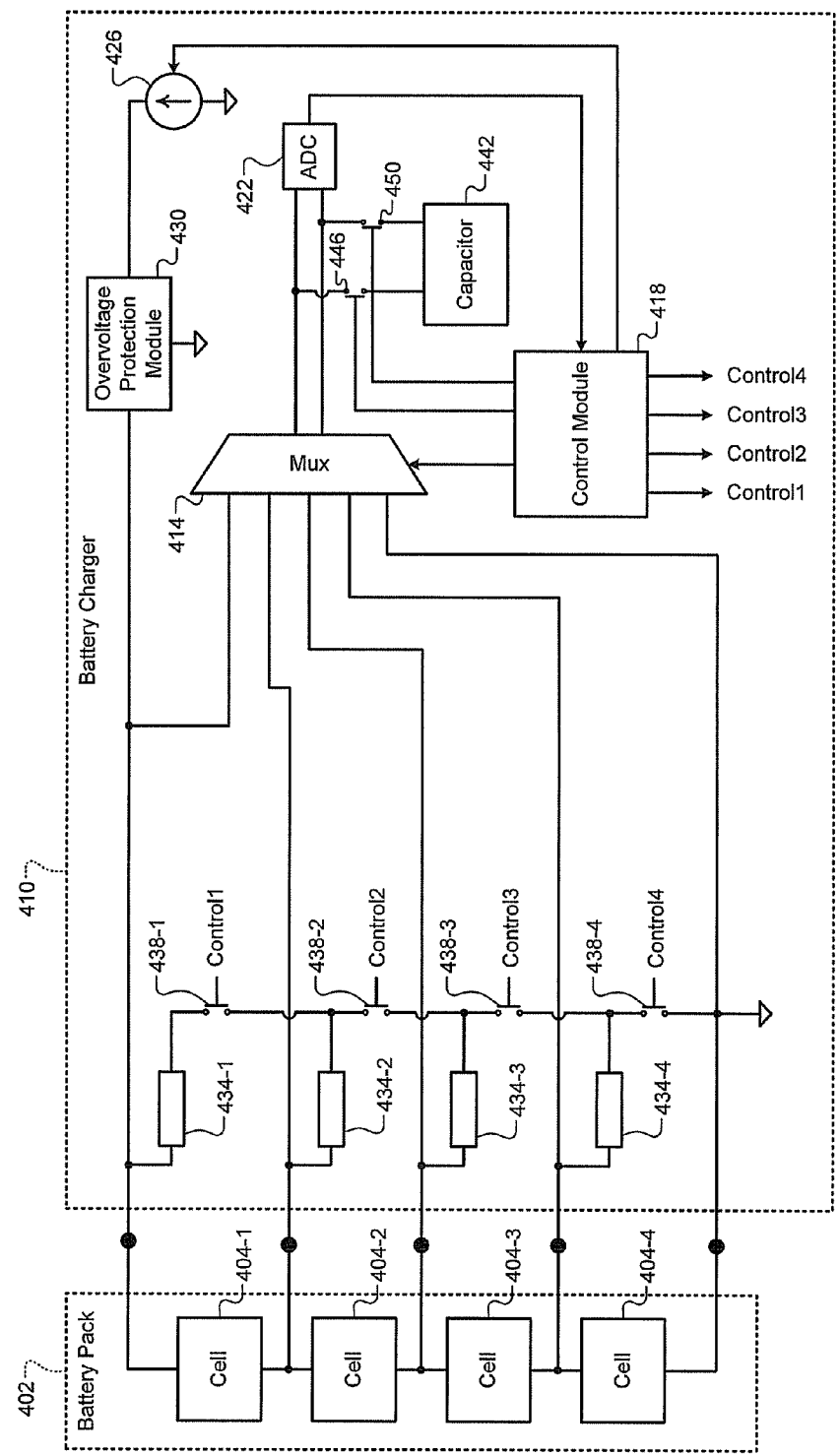
FIGS. 8A-8B are functional block diagrams of exemplary charging systems according to the principles of the present disclosure.
Figure 9:
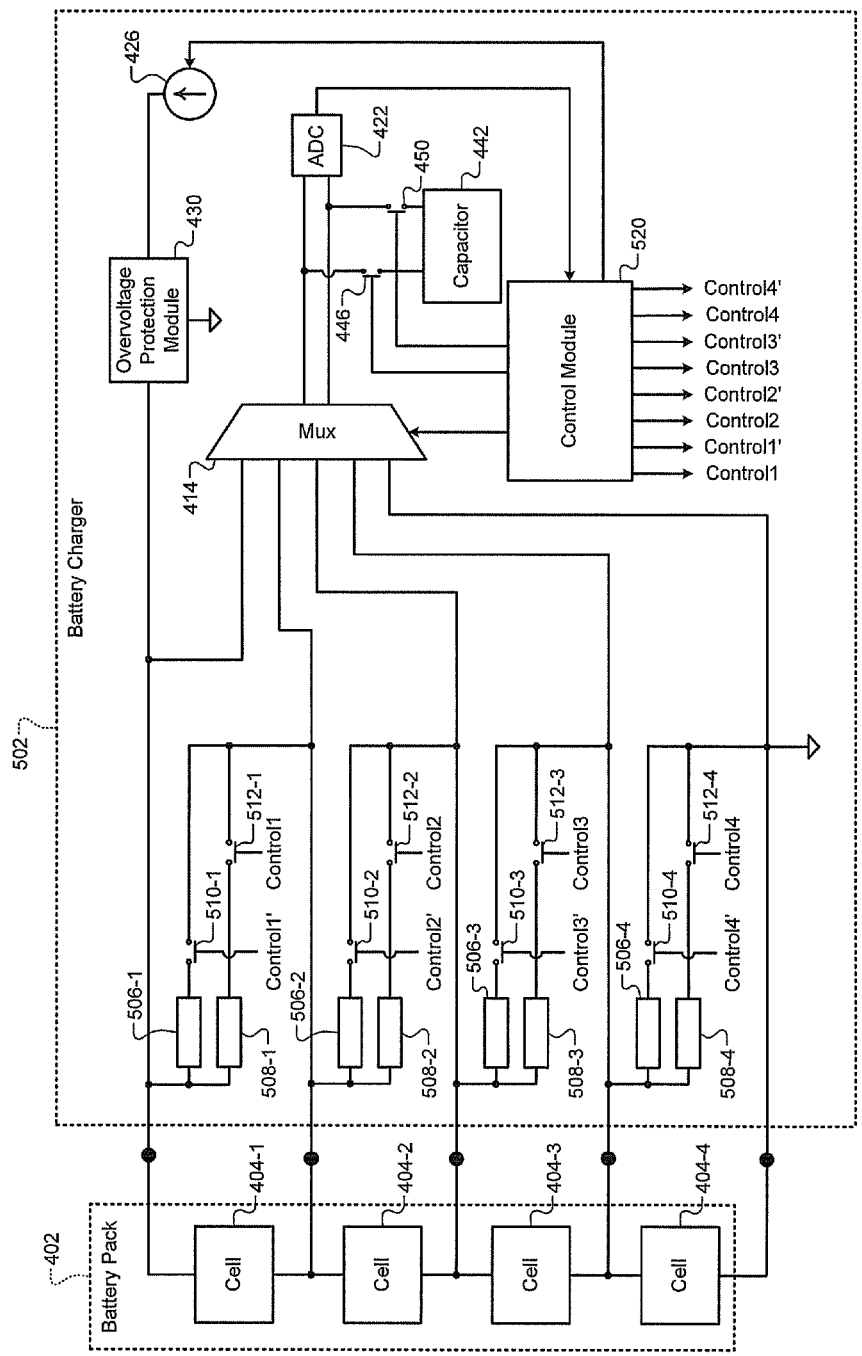
FIG. 9 is a functional block diagram of another exemplary battery charging system according to the principles of the present disclosure.
Figure 12:
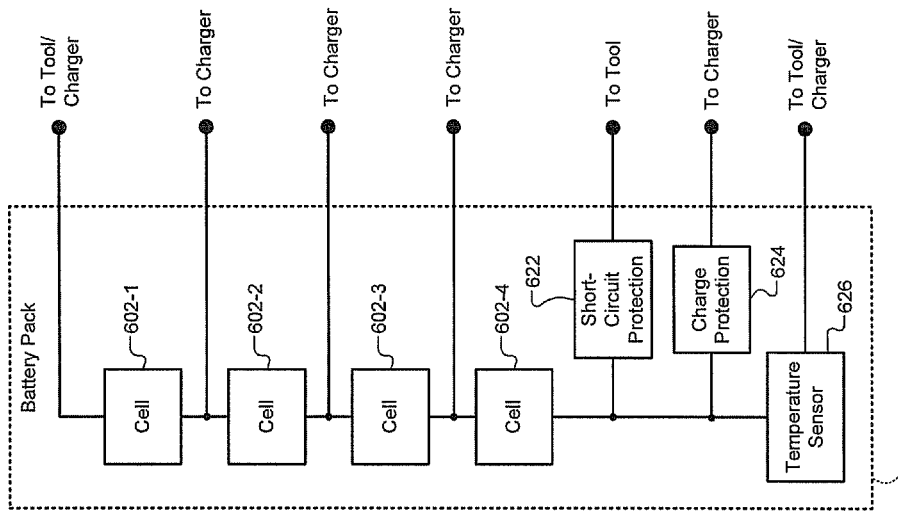
FIG. 12 is a functional block diagram of another exemplary battery pack according to the principles of the present disclosure.
Figure 11:
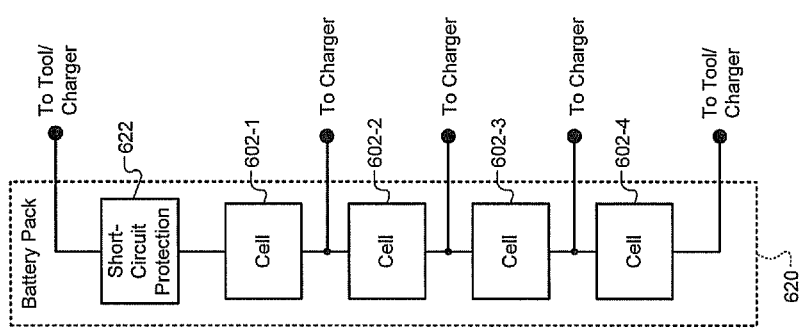
FIG. 11 is a functional block diagram of another exemplary battery pack according to the principles of the present disclosure.
Figure 10:
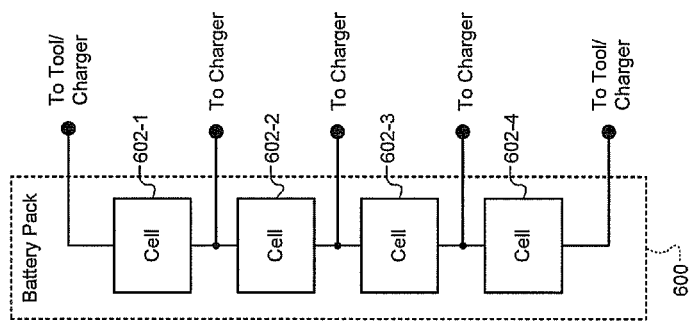
FIG. 10 is a functional block diagram of an exemplary battery pack according to the principles of the present disclosure.

FIG. 6 depicts exemplary steps performed by a battery charger that implements bottom balanced charging according to the principles of the present disclosure. FIG. 7 illustrates exemplary steps performed in discharging the cells to a balanced low (bottom) level. FIGS. 8A-9 depict exemplary charging systems for performing these methods, while FIGS. 10-12 depict exemplary battery packs that can be used in these battery charging systems.

Referring now to FIG. 4A, a graphical depiction of bottom based balancing is shown. Four cells from an exemplary battery pack are depicted, although battery packs according to the principles of the present disclosure may have more or fewer cells. Each of the four cells is discharged to a predetermined bottom capacity. For example, in FIG. 4A, the predetermined bottom capacity is shown as 0.1 Ah.

In order to achieve this bottom capacity in each cell, the voltage of the cell can be measured and its capacity determined from known voltage decay characteristics. FIG. 4B depicts exemplary voltage curves for two cells as they discharge. For example, a fully charged cell may have a voltage above 3 V, and the voltage may initially decrease fairly slowly as the cell is discharged. Once the cell's capacity reaches a low level, the voltage will begin to drop quickly. This change in voltage decrease rate may be referred to as a knee. The voltage knee may correspond to a certain capacity that is fairly consistent across the cells. For example only, the voltage knee may correspond to 0.15 Ah.

All the cells may then be discharged to the point at which their respective voltage knee is observed, at which time they will have approximately equal capacities. However, monitoring voltage rates quickly and determining derivatives in order to precisely determine the knee may require additional circuitry, adding complexity and cost to an implementation. Instead, the position of the knee can be approximately determined by monitoring when the cell crosses a voltage threshold that is less than the knee voltage.

After the knee voltage is reached, the voltage will decrease fairly rapidly. The voltage threshold should therefore be reached fairly soon after the voltage knee, and the point at which the cell voltage crosses the voltage threshold may be a reliable indicator of where the knee voltage was. At the threshold voltage, the capacity of the cell may be slightly lower than at the knee voltage. For example, the cell capacity may be 0.1 Ah.

In FIGS. 4A-B, a threshold voltage of 2.5 V is shown. When approximately determining the knee voltage, each cell can be discharged until it reaches 2.5 V. Once the cell reaches 2.5 V, discharging can be stopped for that cell. The threshold voltage of 2.5 V is for example only. Alternative threshold voltages may be chosen. In addition, threshold voltages may vary based on cell chemistry and construction. The cells may be discharged by applying a load across each cell. For example, the load may be a constant current load, such as a transistor, or may be a resistive load.

To achieve fast discharging, and therefore fast charging, large loads may be applied to the cells. The large load may discharge the cells quickly, but may not allow for an accurate determination of capacity. To combine the fast discharge of a large load with the accuracy of a small load, the large load can be applied until the cell reaches a second threshold voltage. Once the cell has reached the second threshold voltage, a smaller load can be applied to the cell until it reaches the threshold voltage, such as 2.5 V in FIGS. 4A-B. The cells may all be discharged simultaneously, with the discharging of each cell stopped when it reaches the threshold voltage.

In various implementations, the second threshold voltage may be set approximately equal to the threshold voltage. In such implementations, once the cell reaches the threshold voltage, the large load can be removed from the cell. When the large load is removed, the cell voltage may rebound to a level above the threshold. The cell is then discharged using the smaller load until it once again reaches the threshold voltage.

Once the cells have all reached the threshold voltage, a balancing capacitor or capacitors may optionally be sequentially applied across the battery cells. The capacitors can precisely equalize the voltages across the cells. Once the cells have been discharged to a common capacity, charging from this bottom balanced condition can begin.

Referring now to FIG. 5, a graphical depiction of charging from a bottom balanced state is presented. The four exemplary cells, which are arranged in series, may be charged by a common current. As the cells increase in capacity, the voltages of the cells may begin to diverge. Once one of the cells reaches a predetermined maximum voltage, charging can be stopped across all cells. At this point, each of the cells should have approximately the same capacity.

For example only, in FIG. 5, the four cells are charged until the time when the fourth cell reaches 3.6 V. At this point, each of the cells has approximately 1.0 Ah of capacity. The first three cells, however, only have a voltage of 3.2 V at 1.0 Ah of capacity. The threshold voltage of 3.6 V may be chosen, similarly to FIG. 4B, as a voltage that will be crossed during a rapid rise in voltage, which indicates a maximum cell capacity. The threshold voltage may be chosen When a battery pack including cells charged in this manner is used in a tool, the cells will reduce in capacity at the same rate. As capacity decreases, the user will notice the power reduction from the tool and charge the battery before any cells can be damaged. This is in contrast to the prior art method of battery charging, where there may be enough power to run the tool even as one of the cells is driven to low voltages.

In applications where the user may not notice decreasing power, such as in a work light, the electronics in the battery pack or the tool may disconnect battery power once the total voltage of the battery pack decreases to a low level. Because the cells are balanced in terms of capacity, no one cell will see a markedly reduced or even negative voltage.

Referring now to FIG. 6, a flowchart depicts exemplary steps performed by a battery charger according to the principles of the present disclosure. Control begins in step 200, where a timer is reset. Control continues in step 202, where cell voltages are measured. For example only, the cell voltages may be measured serially using a single measurement device. For example only, a multiplexer may output the positive and negative terminals of each cell to an analog-to-digital converter (ADC). The multiplexer may then select each of the cells, whose voltage can be measured by the ADC.

Control continues in step 204, where control determines whether cell voltages are less than a lower threshold. For example, control can determine whether any of the cell voltages is less than the lower threshold, or whether an average cell voltage of all the cells is less than the lower threshold. Alternatively, because the cell voltages should track together closely, control may measure only one cell voltage to determine whether it is than lower threshold.

If cell voltages are lower than the lower threshold, control transfers to a bottom balance and charge operation. For example, the bottom balance and charge operation may be that described in FIG. 7 below. After this process, control continues in step 208. If the cell voltages are not less than the lower threshold in step 204, control transfers to step 212.

In step 212, control determines whether cell voltages are greater than an upper threshold. If so, control transfers to step 208; otherwise, control transfers to step 216. In step 216, cell voltages are not below a lower threshold, implying that they do not need to be fully discharged and recharged. However, they are less than the upper threshold, and so can be incrementally charged.

In step 216, control begins charging all cells. Control continues in step 220, where control determines whether any cell has reached full capacity. If so, control transfers to step 224; otherwise, control remains in step 220. Control may determine whether a cell has reached full capacity by determining whether a cell has reached a predetermined maximum voltage. In step 224, control stops charging all cells, and control continues in step 208.

In step 208, control may determine whether the timer is greater than the threshold. If so, control transfers to step 228; otherwise, control remains in step 208. The timer may measure time in terms of days. After a predetermined number of days, such as 30, where the battery pack has remained on the charger, a new bottom balancing charge procedure may be carried out. As such, in step 228, control resets the timer, and then performs bottom balancing and charging, such as according to FIG. 7.

Referring now to FIG. 7, a flowchart depicts exemplary steps performed in bottom balancing and charging according to the principles of the present disclosure. Control begins in step 302, where control starts discharging all cells of the battery pack. Control may begin when a battery pack is inserted into the charger.

Control continues in step 306, where control determines whether any cell has reached a low capacity. If so, control transfers to step 310; otherwise, control transfers to step 314. Control may determine that a cell has reached a low capacity by determining when the voltage across the cell has decreased below a threshold level.

In step 310, control determines whether a large load is applied to the cell that has reached the low capacity. If so, control transfers to step 318; otherwise, control transfers to step 322. In step 318, the large load is removed from the cell and the small load is applied to the cell. Control then continues in step 314. Control may be modified by including more than two load sizes. For example only, three or more loads may be sequentially applied when discharging a cell. In addition, the load size may be variable, increasing as the cell capacity decreases.

In step 322, control stops discharging the cell, and control continues in step 314. Steps 310 and 318 are optional, and may be used when both large and small loads are used for discharging. If a single load is applied to the cells, step 306 may proceed directly through step 310 to step 322. In step 314, control determines whether discharging has stopped for all cells. If so, control returns to step 306; otherwise, control transfers to step 326.

Step 306 may be easily modified to determine whether a cell has crossed a first threshold voltage when a large load is applied or a second threshold voltage when a small load is applied. In step 326, control begins charging all cells, and control continues in step 330. In step 330, control determines whether any cell has reached full capacity. If so, control transfers to step 334; otherwise, control remains in step 330. Control may determine that a cell has reached full capacity when the voltage across the cell has reached a predetermined maximum voltage. In step 334, control stops charging all cells. Control then ends.

Referring now to FIG. 8A, a functional block diagram of an exemplary charging system is presented. A battery pack 402 includes four cells, 404-1, 404-2, 404-3, and 404-4. For purposes of illustration only, the battery pack 402 is shown with four cells 404, although fewer cells may be present. The battery pack 402 has been simplified, with no short-circuit protection or any other features shown.

A battery charger 410 includes a multiplexer 414 that receives voltages from the positive and negative terminals of each of the cells 404. The multiplexer 414 is controlled by a control module 418. Based on input from the control module 418, the multiplexer 414 selects the positive and negative terminals of one of the cells 404-1 and outputs the voltage at the selected terminals to an analog-to-digital converter (ADC) 422.

The ADC 422 converts the analog voltage across the selected cell 404 to a digital value that is output to the control module 418. The ADC 422 may sample periodically or may be triggered to sample when the control module 418 selects a new cell 404 using the multiplexer 414. To charge the cells 404, the control module 418 controls a current source 426. The current source 426 outputs a current to the positive terminal of the cell 404-1 of the battery pack 402. Alternatively, the current may be output to the negative terminal of the cell 404-4.

The current of the current source 426 may pass through an overvoltage protection module 430. The overvoltage protection module 430 provides redundant protection to prevent overcharging the battery pack 402. If the voltage across the battery pack exceeds a predetermined threshold, the overvoltage protection module 430 may disconnect the current source 426 from the battery pack 402.

The current source 426 may output a predefined current, or may output a current based upon a value from the control module 418. To discharge the cells 404, load resistors 434-1, 434-2, 434-3, and 434-4 are arranged across the cells 404-1, 404-2, 404-3, and 404-4, respectively. The load resistors 434-1, 434-2, 434-3, and 434-4 are controlled by switches 438-1, 438-2, 438-3, and 438-4, respectively.

The switches 438 are controlled by respective control lines from the control module 418. The load resistors 434 dissipate stored energy from the cells 404. While discharging is occurring, the control module 418 monitors the voltages of the cells 404 via the multiplexer 414 and the ADC 422. As each cell 404 reaches the predetermined voltage threshold, the control module 418 instructs the associated switch 438 to disconnect the associated load resistor 454.

Once the control module 418 has disconnected all of the load resistors 434, the control module 418 may sequentially apply a capacitor 442 across each of the cells 404. The capacitor may be switched via first and second switches 446 and 450. The capacitor 442 may be applied to each of the cells 404 by the multiplexer 414. The capacitor 442 may be quickly applied to each of the cells 404 a large number of times to precisely balance the voltages across the cells 404. Alternatively, the ADC 422 may monitor cell voltages to determine when capacitor-based balancing can end.

Figure 8B:
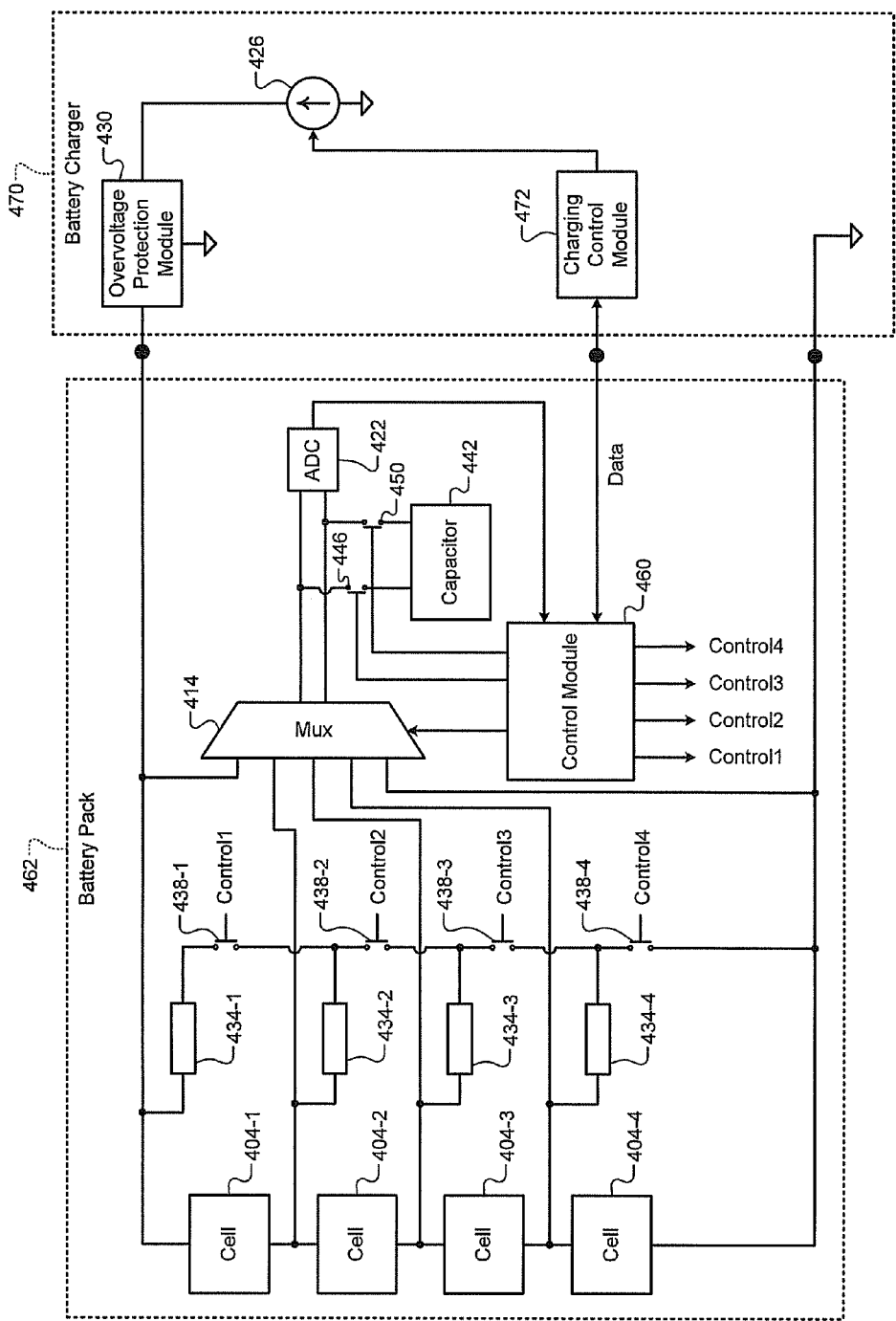

Referring now to FIG. 8B, a functional block diagram of a battery charging system where various components are located in the battery pack is presented. One or more of the circuit components of the battery charger 410 of FIG. 8A may instead be located in the battery pack 402. For example, the location of circuit components may be determined based upon commercial decisions regarding the relative cost of battery packs and battery chargers.

By locating more components in the battery pack, the number of electrical contacts on the battery pack may be reduced. In addition, components in the battery pack may present a consistent external interface, thereby allowing a single battery charger to operate with diverse battery packs.

For example only, FIG. 8B depicts a configuration where the load resistors 434, the switches 438, 446, and 450, the multiplexer 414, the ADC 422, the capacitor 442, and a control module 460 similar to the control module 418 of FIG. 8A are located in a battery pack 462. A battery charger 470 includes the current source 426 and the overvoltage protection module 430.

The battery charger 470 may also include a charging control module 472 that exchanges data with the control module 460. The control module 460 may indicate to the control module 472 a desired charging current. In addition, the control module 460 may indicate an overvoltage value, which the control module 472 may transmit (not shown) to the overvoltage protection module 430. The overvoltage protection module 430 may use the overvoltage value to determine when an overvoltage condition occurs.

The control module 460 may receive charging instructions from the control module 472, which may be controlled by a user interface (not shown). The control module 472 may also display charge level information about the battery pack 462 and whether charging or discharging is currently occurring. The battery pack 462 may include a regulator to provide a stable power voltage for operation of the control module 460 based on the charging voltage received. Alternatively, the control module 460 may receive power along with the data from the control module 472.

Referring now to FIG. 9, a functional block diagram of another exemplary battery charging system according to the principles of the present disclosure is presented. A battery charger 502 may include components similar to that of the battery charger 410 of FIG. 8A. The battery charger 502 may include first and second load resistors 506 and 508 for each of the cells 404.

One terminal of the load resistors 506 and 508 is connected to a positive terminal of the associated cell 404. The opposite terminals of the load resistors 506 and 508 are connected to the negative terminal of the associated cell via switches 510 and 512, respectively. The load resistors 506 may have a low resistance, presenting a large load to the corresponding cell 404. The load resistors 508 may have a higher resistance, presenting a lower load to the cells 404. In various implementations, both load resistors 506 and 508 may be applied across the cell 404 to create a smaller parallel resistance and therefore a larger load.

A control module 520 senses the voltage across each of the cells 404. The control module 520 may initially apply the large loads 506 to the cells 404. When a cell 404 reaches a predetermined voltage threshold, the control module 520 may disconnect the large load 506 and connect the small load 504. After the small load 504 has been connected, once the cell 404 reaches a second predetermined voltage threshold, the control module 520 disconnects the small load 504. Various components of the battery charger 502 may be located within the battery pack 402, similar to the example of FIG. 8B.

Referring now to FIG. 10, a functional block diagram of an exemplary battery pack 600 according to the principles of the present disclosure is presented. The battery pack 600 includes multiple cells 602. For purposes of illustration only, the battery pack 600 is shown with four cells 602-1, 602-2, 602-3, and 603-4, though more or fewer are possible. The cells 602 each have a positive and negative terminal.

The positive terminal of the cell 602-1 is connected to an external contact that interfaces with a power tool or a battery charger. The negative terminal of the cell 602-4 is connected to an external contact that interfaces with the power tool or the battery charger. The negative terminals of the cells 602-1, 602-2, and 603-3 connect to external contacts that interface with the battery charger. Because the battery charger bottom balances the cells 602, and then charges the cells 602 to a common capacity, the battery pack 600 does not need to have a low voltage protection system.

Referring now to FIG. 11, a functional block diagram of another exemplary battery pack 620 according to the principles of the present disclosure is presented. The battery pack 620 is similar to the battery pack 600, but includes short-circuit protection 622. The short-circuit protection may be located between the positive terminal of the cell and the external contact. Alternatively, the short-circuit protection 622 may be located between the negative terminal of the cell 602-4 and the external contact. The short-circuit protection 622 may stop conducting when a current above a predetermined threshold is detected.

Referring now to FIG. 12, a functional block diagram of another exemplary battery pack 640 according to the principles of the present disclosure is presented. The battery pack 640 includes short-circuit protection 622. The short-circuit protection 622 may be located between the negative terminal of the cell 602-4 and an external contact that interfaces with the tool. The positive terminal of the cell 602-1 connects to an external contact that interfaces with the power tool or the battery charger.

A charge protection module 624 is located between the negative terminal of the cell 602-4 and an external contact that interfaces with the battery charger. The charge protection module 624 may allow a greater amount of current to flow than the short-circuit protection 622. In this way, the charger can quickly discharge the cells 602 of the battery pack 640 at a current level that might appear as a short-circuit to the short-circuit protection 622.

The battery pack 640 may also include a temperature sensor 626 that may be located between the negative terminal of the cell 602-4 and an external contact that can interface with the tool and the charger. In this way, the tool and/or the charger can determine the temperature of the battery pack 640. In various implementations, the temperature sensor 626 may include a thermocouple.

Battery charging according to the principles of the present disclosure may allow battery packs to be produced with very limited electronics, as shown in FIGS. 10-12. Such charging techniques prevent any one battery cell from prematurely running out of capacity and risking damage. In this way, battery packs may be manufactured, without monitoring electronics, at lower expense and with lower weight. Further, electronics in the battery charger may be less subject to vibration and impact than electronics in a battery pack inserted into a cordless power tool. Advantages in battery life and safety may also be recognized, regardless of whether electronics are located in the battery or battery pack.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of charging a battery pack comprising:
   providing a battery pack having a plurality of cells, the plurality of cells connected in series;
   providing a battery charger;
   electrically coupling the battery pack to the battery charger;
   upon electrically coupling the battery pack to the battery charger and while maintaining the series connection of the plurality of cells, the battery charger discharging all of the plurality of cells of the battery pack individually and simultaneously;
   stopping the discharging of each cell of the plurality of cells when said each cell of the plurality of cells discharges to a predetermined low capacity threshold and continuing to discharge any remaining cells of the plurality of cells that have not discharged to the predetermined low capacity threshold; and
   charging all of the plurality of cells only after the discharging has stopped for all of the plurality of cells.

2. The method of claim 1 further comprising:
   selectively applying a first load to a first cell of the plurality of cells;
   applying a second load to the first cell after applying the first load to the first cell; and
   stopping discharging the first cell after applying the second load to the first cell.

3. The method of claim 2 further comprising:
   measuring a voltage of each of the plurality of cells;
   applying the second load to the first cell after the measured voltage corresponding to the first cell is less than a first threshold voltage; and
   stopping discharging the first cell after the measured voltage corresponding to the first cell is less than a second threshold voltage.

4. The method of claim 3 wherein the first and second threshold voltages are approximately equal.

5. The method of claim 2 wherein the second load draws less current than the first load.

6. A battery charger comprising:
   a housing;
   a discharging device, in the housing, that discharges each of a plurality of cells of a battery pack, the plurality of cells connected in series;
   a charging device, in the housing, that charges the plurality of cells; and
   a control module that, upon electrically coupling the battery pack to the charging device and while the maintaining the series connection of the plurality of cells, selectively instructs the discharging device to discharge all of the plurality of cells individually and simultaneously, that selectively instructs the discharging device to stop discharging each cell of the plurality of cells when said each cell of the plurality of cells discharges to a predetermined low capacity threshold and continuing to discharge any remaining cells of the plurality of cells that have not discharged to the predetermined low capacity threshold, and that selectively instructs the charging device to begin charging all of the plurality of cells only after discharging is stopped for all the plurality of cells.

7. The battery charger of claim 6 wherein the discharging device includes first loads that are selectively applied to the plurality of cells and second loads that are selectively applied to the plurality of cells, wherein the discharging device applies one of the second loads to a first cell of the plurality of cells after applying one of the first loads to the first cell, and wherein the discharging device stops discharging the first cell after applying the one of the second loads to the first cell.

8. The battery charger of claim 7 further comprising a measurement device that measures a voltage of each of the plurality of cells, wherein the discharging device applies the one of the second loads to the first cell after the measured voltage corresponding to the first cell is less than a first threshold voltage, and wherein the discharging device stops discharging the first cell after the measured voltage corresponding to the first cell is less than a second threshold voltage.

9. The battery charger of claim 8 wherein the first and second threshold voltages are approximately equal.

10. The battery charger of claim 7 wherein the second loads draw less current than the first loads.

* * * * *